3,463,662
POLYURETHANE-POLYSILOXANE
GRAFT COPOLYMERS
William Hodes, Edison Township, Middlesex County, N.J., assignor to American Standard Inc., New York, N.Y., a corporation of Delaware
No Drawing. Continuation-in-part of application Ser. No. 341,742, Jan. 31, 1964. This application Apr. 19, 1967, Ser. No. 631,905
Int. Cl. C09d 3/72, 3/82
U.S. Cl. 117—118     5 Claims

ABSTRACT OF THE DISCLOSURE

Stain and abrasive resistance articles consisting of a polyurethane substrate having grafted thereon a layer of a polysiloxane. The polyurethane substrate can be the reaction product of adipic acid-butanediol-tolylene diisocyanate. The polysiloxane can be formed by hydrolysis and condensation of a dimethyldichlorosilane and methyltrichlorosilane or dichlorodialkylsilane cross-linked by alkyltrichlorosilane.

---

This application is a continuation-in-part of S.N. 341,-742, filed Jan. 31, 1966, now abandoned.

This invention relates to a process for rendering articles stain-resistant and to the articles produced thereby. The invention herein disclosed is particularly adaptable for providing stain-resistant, plastic coatings which are resistant to abrasion and have high gloss retention.

Polysiloxane coatings are well known in the art of forming hydrophobic surfaces. Their ability to resist staining has been successfully applied as fabric finishes. However, siloxane coatings can be removed by abrasion, or be lifting from many substrates. Unexpectedly, it has been found, in this invention, that graft polymerization of siloxanes on the active surface sites of particular elastomers provides a hydrophobic, stain-resistant surface that resists abrasion and marring.

Polyurethane elastomers, which can be prepared with a high gloss surface, are in themselves extremely resistant to abrasion. Moreover, they have many reactive sites for initiating siloxane condensations, i.e., those sites which contain labile protons in the polyurethane gel lattice such as hydroxyl, amine, ureido, and allophanate groups, as well as tightly bound water molecules. Silanes that contain active or potential nucleophilic atoms, such as chloro- or bromo-silanes, silicon hydrides, silanols, and alkoxy silanes can be made to react with the elimination of the protonated nucleophile and formation of a silicon-oxygen or silicon-nitrogen bond to the elastomer skeleton. The presence of one or more additional functional groups in the silane reagent permits polymerization by hydrolysis to the reactive silanol intermediate and condensation by heat to form the polysiloxane molecules that have one or more chemical bonds to the polyurethane molecules. If the layer of polysiloxane graft is made extremely thin, the original high gloss and the marring and abrasion resistance of the polyurethane coating is preserved together with a newly enhanced stain-resistance of the polyurethane when subjected to the slow wear of soil or the rapid cleansing action of scouring agents. Even at very low levels of grafting, the presence of siloxane bonds is apparent several mm. below the surface, as observed by reflectance infrared spectrophotometry.

Pervious methods are deficient in that they apparently failed to forsee how a reaction could take place between a polyurethane, per se, and a polymerizable silane. Many methods describe combinations of reagents that tacitly assume no reaction will take place between polyurethane, per se, and silane by the fact that unreacted OH groups are introduced as sites for reaction in addition to the presence of urethane groupings and other materials in the substrate. In no case, however, is there taught reaction except between hydrolyzable groups.

Accordingly, an object of this invention therefore is to provide materials suitable for the production of stain-resistant articles, such as plumbing fixtures, in particular sinks made of plastic materials, with a gloss retention under abrasive conditions comparable to porcelain enamel.

Another object of this invention is to provide a polymer composition comprising a completely reacted cured elastomeric polyurethane body having bonded thereto on its surface a thin surface layer of a polysiloxane.

A further object of this invention is to graft to the surface of a completely reacted polyurethane body (that is, one having no unreacted OH groups present therein) a thin layer of polymer having a good stain resistance, which layer is thin enough to retain the elastomeric properties of the polyurethane, but thick enough to prevent the staining thereof. In this way, the extraordinary abrasion resistance and gloss retention of polyurethanes surprisingly persists, coupled with an added property of stain resistance.

A further object of this invention is to form high gloss surface coatings which may be applied to substrates of metals or plastics, and which can resist surface marring and the attack of staining agents.

These and other related objects, features, and advantages of the present invention will be more fully realized as the description thereof proceeds, particularly when taken together with the combination of materials of composition and the preferred process for preparing the new, grafted surface.

The instant invention concerns itself with a silane reaction on completely cured and formed polyurethanes which are rubbery and exceedingly smooth with glossy surfaces signifying a high degree of polymerization. The instant elastomers are far advanced beyond the undesirable tacky state exhibited by resins of low molecular weight, and those which are essentially non-polymeric, by virtue of the physical state (solid, non-tacky), and physical properties (higher heat distortion temperatures, brittle points, elastic modulus, tensile strength, elongation, compact strength, dynamic modulus and so forth).

The present invention provides a stain and abrasion resistant article consisting of a cured elastomeric body being the reaction product of a dihydroxy compound such as, adipic acid-butanediol and diisocyanato compound such as, 2,-4-tolylene diisocyanate and cross-linked by polyhydroxy compound such as, trimethylolpropane, having grafted thereon, on the surface, thereof, a layer of the polysiloxane formed by hydrolysis and condensation of polyfunctional silane such as dimethyldichlorosilane and methyltrichlorosilane.

In the process aspect of this invention, the polyurethane elastomers can be made stain-resistant by the application of silanes from solution, or as fine aerosol sprays or preferably as vapors. Thus, a formed body of polyurethane elastomers may be painted, coated, dipped or sprayed with a solution or suspension of a reactive silane, in the absence of moisture, or preferably reactive silanes may be brought in contact with the subject polyurethane bodies in a chamber which had been previously evacuated and freed of moisture. Vapors of silanes of different composition may be contacted with polyurethane, simultaneously vapor mixtures, or sequentially, in order to form condensing sites of varying silane content and composition on the polyurethane surfaces. The time of exposure to silane vapors is controlled to effect an ultimate product containing 0.01 to 5% (and over) by weight of grafted siloxanes. In a similar process, polyurethanes are dipped in solution of liquid or vaporous silanes, or coated or sprayed with such solution for controlled time of exposure to limit the polysiloxane content of the ultimate composite product.

The amount of polysiloxane grafted to the polyurethane surface is governed so that the elastomer, high gloss, abrasion resistant characteristics of the polyurethane substrates are retained. Thus it is found that grafting polysiloxanes to the level of 0.01 to 5% (and over) by weight increase of the polyurethane will fall within the specifications set for retention of polyurethane properties while enhancing the resistance to staining.

Composite polyurethanes which have been exposed to the reactive silane vapors or solutions for limited times, at controlled temperatures and humidity are subsequently washed with water or exposed to air of high relative humidity, or steam, or dipped in an aqueous alkaline bath such as for example, but without limitation, sodium hydroxide. The washed composites are reacted at elevated temperatures (e.g., 80–120° C.) for controlled times often in the presence of acids, in order to effect hydrolysis and condensation of organic polysiloxanes in the composite.

The solid elastomeric completely reacted polyurethanes which may be rendered more inert toward household stains and retain the glossy, non-abraded surface are conventionally prepared from hydroxyl-bearing polyesters, polyurethanes or polyethers with diisocyanates together with chain extenders of diols or diamines and cross-linking agents such as polyols and polyamines. Typical polyurethane elastomers which were treated by the process of this invention were prepared in parts by weight: (A) polyester-polyurethane prepared from adipic acid-butanediol and 2,4 tolylene diisocyanate with 6.0–7% NCO content, 100 parts; and cross-linked by trimethylolpropane, 47 parts; (B) a polyurethane prepared from adipic acid-butanedioltolylene diisocyanate, having 6.0–7% NCO content, 100 parts; and 4,4' methylene-bis-(2-chloro-aniline), 20 parts; (C) a polyurethane based on adipic acid-butanedioltolylene diisocyanates, having 4.0 to 5.0% NCO groups by weight, 100 parts; 1,4 butanediol, 3.5 parts, epoxy paste pigments, 5.5 parts, and trimethylol propane, 0.67 part. The polyurethane preparations were cast or molded and oven cured at 80°–140° C. for 3 to 24 hours.

Preferred polyurethane substrates are elastomers which can contain an excess of hydroxyl, amino, ureido, allophanate groups, as well as bound water. These elastomers can be cast and formed prior to the silane treatment and are treated preferably in a vacuum chamber where they can be exposed to silane vapors without excessive heating.

Among the silanes which are equivalent for the purposes of this invention are those which contain functions that react with labile hydrogen, and have the formula $R_nSiX_{4-n}$ where $n=0$ to 3, R is an alkyl or phenyl hydrocarbon group, or an alkyl group bearing terminal organic functions such as amine-, or cyano- or halogen; X is F, Cl, Br, I; OH (when $n=2$ and 3); OR' (where R' is alkyl or phenyl hydrocarbon group); H (where $n=0$, 1 or 2), and $NH_2$. For example but without limitation, the silanes which can be used in the process of the present invention include $(CH_3)_2SiCl_2$, $CH_3SiCl_3$, $C_4H_9SiCl_3$, $SiF_4$, $Cl_2Si(CH_2CH_2CN)_2(C_2H_5)_2Si(OCH_3)_2$

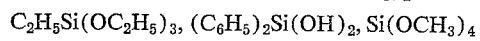
$C_2H_5Si(OC_2H_5)_3$, $(C_6H_5)_2Si(OH)_2$, $Si(OCH_3)_4$ $SiHCl_3$; $(CH_3)_2SiH_2$, and $(t-C_4H_9)_2Si(NH_2)_2$, methyl silane/dimethylsilane; dimethyldiethoxy silane/triethoxy silane+/or tetramethoxy silane; diethyldiethoxy silane/methyl triethoxy silane; n-butyl trichlorosilane; allyl trichlorosilane; β-cyanoethyltriethoxy silane; β-cyanoethylmethyldiethoxy silane. Preferred silanes are those where $n=0$, 1, or 2 which permits chain propagation and cross-linking reactions to take place with the formation of polysiloxane subsequent to grafting. Preferred polysiloxane grafts on polyurethane surfaces are formed when two or more of the reactive silanes are used, one reagent for chain extension, another for branching and cross-linking propagation and preferably in sequence such that the cross-linking silane ($n=0$, 1) is used subsequent to the chain extending silane ($n=2$). As an example, one preferred treatment involves exposure to vapor of dimethyldichlorosilane followed by exposure to vapors of methyltrichlorosilane, to be followed by washing with water and alkali solutions, heating to dryness, and then curing at 80°–100° C.

In the preferred method of this invention, the sample to be treated is suspended in an evacuable reaction vessel. Fixed volumes (quantities) of the aforementioned silanes are introduced into their respective evacuable reservoirs and degassed by three or more freeze-thaw cycles under alternating vacuum and nitrogen atmospheres. The connecting system and reaction zone are freed of air and refilled with dry nitrogen. The system is pumped out to about 0.5 mm. Hg and the silane is evaporated into the reaction vessel. After a given exposure time substantially proportional to the coating thickness desired, this silane vapor is removed and a second silane vapor admitted to the reaction vessel. During the course of the silane reaction, evolution of volatile by-products, such as hydrogen chloride, water, etc. can be observed by the growth in internal pressure with time. After the reaction, the sample is freed of unreacted silane and volatile products by evaporation. The polyurethane sample which had reacted with organo silane subsequently exposed to air, and if preferable, washed in water and alkali, rinsed, and dried. Newly formed composite samples are cured in a draft oven at elevated temperatures.

In the following examples, which are illustrative of the present invention, parts and percentages are by weight unless otherwise specifically noted:

EXAMPLE I

The reaction of a 100 parts liquid urethane containing 6.2% NCO (e.g., Du Pont LD167) and 6.82 parts of trimethylolpropane (Composition A, above) produces a polyurethane elastomeric substrate. The mixture is stirred in a 1 liter resin flask, under a nitrogen atmosphere at 215° F. until homogeneous. The reaction mixture is cast on a glass plate, and the sheet is cured in an oven at 220° F. for ten hours.

The clear, high gloss sample readily retains a permanent stain after being exposed to a staining test. A representative staining test is run with one drop of 3% tincture of iodine, commercial brown shoe polish, and of a 2% aqueous gentian violet solution, exposed for 15 minutes, 1 hour, and 24 hours. After the assigned exposure period, the spot is washed with water and alcohol to remove the surface deposit. The surface abrasion resistance is evaluated qualitatively by observing the abrasive effect of a rubber eraser.

There is no marring of the polyurethane elastomer surface in this case. A further test of abrasion is based on the reduction of 60° specular gloss after abrading the surface with a flint load sponge up to 1600 cycles. In the case of polyurethane elastomers, there is no loss of reflectivity from the original reading of 90–110. This resembles porcelain enamel which shows little or no loss of reflectivity for original high values of 90–100.

EXAMPLE II

A one inch disc of polyurethane elastomer, as prepared in Example I, is exposed to the vapors of 3 ml. of methyltrichlorosilane for 24 hours in a 1 p.p. ml. flask. After exposure to air, the sample is washed with water, aqueous sodium hydroxide, and rinsed with water. It is dried and heated at 100° C. for 8 hours. The sample exhibits a weight gain of 21.3% and is no longer stained by iodine, shoe polish, or gentian violet after 24 hours exposure. The surface resists marring by an eraser.

EXAMPLE III

A sample of the polyurethane elastomer prepared in Example I was exposed for 30 minutes at room temperature in a 100 ml. round bottom flask to the vapors of dimethyldichlorosilane. The vessel was then evacuated, followed by admission of the vapors of methyltrichlorosilane for 16 hours reaction time. The sample was washed with alkali and water, followed by 4 hours in the oven at 110° C. The sample surface was found to be non-stained by shoe polish solution and gentian violet solution, and only slightly stained by the tincture of iodine. The high gloss surface could not be abraded by a rubber eraser action.

EXAMPLE IV

A polyurethane substrate, as described in Example I, is exposed to the vapors of dimethyldichlorosilane in a 100 ml. standard-taper reaction flask for 24 hours. The vessel is re-evacuated and then exposed to the vapors of methyltrichlorosilane for 24 hours. Following the described methods of washing and drying, it was found that only 0.8% of grafted polysiloxane had been added to the sample. The surfaces are not permanently stained by iodine, shoe polish, or gentian violet solutions.

The infrared spectra measured by attenuated total reflectance show the characteristic radiation absorption at 1260–1270 cm.$^{-1}$ characteristic of $(CH_3)_2$ —Si— and at 975–1100 cm.$^{-1}$ characteristic of —Si—O. The glossy surface is not abraded by an eraser.

EXAMPLE V

A polyurethane elastomer prepared from adipic acid-butanediol-tolylene diisocyanate, having 6.0–7.0% NCO content, 100 parts, and 4.4′methylene-bis(2-chloroaniline), 20 parts, was formed and cured in 1½ hours, at 100° C. The elastomer was immersed 1 hour in a benzene solution of diphenyl dichlorosilane, followed by several hours immersion in a benzene solution of phenyl-trichlorosilane. The surface resisted staining by conventional household reagents, by which the urethane elastomer was severely discolored.

EXAMPLE VI

A polyurethane elastomer prepared as in Example V was sprayed with a 2% ether solution of equal parts of dimethyldiethoxy silane and triethoxy silane in a dried atmosphere. The composite was exposed to air, washed with 1% sodium hydroxide solution and heated to form a condensed polysiloxane graft.

EXAMPLE VII

A polyurethane elastomer prepared from adipic acid-butanediol-tolylene diisocyanate having 4.0 to 5.0% NCO groups by weight, 100 parts; 1,4 butanediol 3.5 parts; epoxy paste pigments, 5.5 parts, and trimethylol propane, 0.67 part, was cast as a sheet and oven cured at 100° C. for 5 hours.

In an evacuated chamber, freed of air and moisture, mixed vapors of dimethylsilane and methylsilane were brought in contact with the cured elastomer for several minutes. The composite was exposed to air, washed and heated to complete conduction of the graft copolymer. Such products were found more resistant to staining by conventional household reagents than polyurethane elastomers.

Results with materials equivalent to those obtained in Examples II–IV are obtained when the silanes are sprayed on the polyurethane body in the form of fine aerosol sprays and when the silanes are applied from solutions thereof. It will be obvious to those skilled in this art, from the disclosure herein, that substrates of metal or of other plastic materials such as polyethylene which are coated with polyurethane compositions may then be treated with silanes by the method of this invention to form stain and abrasion-resistant surfaces thereon. In this aspect of the invention, the polyurethane can be applied from a finished coating product and cured in place prior to exposure to silane vapors, as described previously.

The process of this invention has also been carried out as in Examples I–VII but using Compositions B and C, disclosed above. Examination of the surfaces of the articles so produced by the tests described before reveals that the stain and abrasion resistances of these surfaces are not materially affected by the change in the composition of the elastomeric polyurethane substrate.

As various possible variations can be made of the invention disclosed herein, it is to be understood that all matter hereinabove set forth is to be interpreted as illustrative and not in a limiting sense.

What is claimed is:

1. A stain and abrasion resistant article consisting of a cured elastomeric body being the reaction product of adipic acid-butanediol and 2,4-tolylene diisocyanate and cross-linked by trimethylolpropane, having grafted thereon, on the surface thereof, a layer of the polysiloxane formed by hydrolysis and condensation of dimethyldichlorosilane and methyltrichlorosilane.

2. A graft copolymer of a cross-linked polyurethane being the reaction product of adipic acid-butanediol and extended by 2,4-tolylene diisocyanate, having grafted on the surface thereof the polysiloxane formed by hydrolysis and condensation of dimethyldichlorosilane and methyltrichlorosilane.

3. A stain and abrasion-resistant polyurethane substrate being the reaction product of 100 parts by weight of adipic acid-butanediol-tolylene diisocyanate having 6.0 to 7.0% NCO content cross-linked by 47 parts by weight of trimethylolpropane having grafted on the surface thereof the polysiloxane formed by hydrolysis and condensation of methyltrichlorosilane.

4. A graft copolymer of a cross-linked polyurethane being the reaction product of 100 parts by weight of adipic acid-butanediol-tolylene diisocyanate having 6.0 to 7.0% NCO and 47 parts by weight of trimethylolpropane having grafted on the surface thereof the polysiloxane formed by hydrolysis and condensation of methyltrichlorosilane.

5. A stain and abrasion-resistant polyurethane substrate being the reaction product of 100 parts by weight of adipic acid-butanediol-tolylene diisocyanate having 6.0 to 7.0% NCO content cross-linked by 47 parts by weight of trimethylolpropane having grafted on the surfaces thereof the polysiloxane formed by the hydrolysis and condensation of a dichlorodialkylsilane and cross-linked by an alkyltrichlorosilane.

References Cited

UNITED STATES PATENTS 2,306,222   12/1942   Patnode _____ 117—106

FOREIGN PATENTS 481,215   2/1952   Canada.

OTHER REFERENCES

Weigel, German application 1,011,624, printed July 1957.

SAMUEL H. BLECH, Primary Examiner

U.S. Cl. X.R.

117—106, 138.8, 161; 260—824